United States Patent
Feldman et al.

(10) Patent No.: US 10,297,853 B2
(45) Date of Patent: May 21, 2019

(54) SOLID OXIDE FUEL CELL HAVING A DENSE BARRIER LAYER

(71) Applicant: Saint-Gobain Ceramics & Plastics, Inc., Worcester, MA (US)

(72) Inventors: Brian P. Feldman, Northborough, MA (US); Craig M. Adams, Webster, MA (US); Zachary R. Patterson, Newton, MA (US); Ayhan Sarikaya, Worcester, MA (US); Aravind Mohanram, Northborough, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 1173 days.

(21) Appl. No.: 14/317,882

(22) Filed: Jun. 27, 2014

(65) Prior Publication Data

US 2015/0004519 A1    Jan. 1, 2015

Related U.S. Application Data

(60) Provisional application No. 61/841,298, filed on Jun. 29, 2013.

(51) Int. Cl.
*H01M 8/0271* (2016.01)
*H01M 8/0282* (2016.01)
(Continued)

(52) U.S. Cl.
CPC ....... *H01M 8/2425* (2013.01); *H01M 8/0271* (2013.01); *H01M 8/0282* (2013.01); *H01M 8/1213* (2013.01); *H01M 2008/1293* (2013.01)

(58) Field of Classification Search
CPC .................................................. H01M 8/0282
See application file for complete search history.

(56) References Cited

U.S. PATENT DOCUMENTS

| | | | | |
|---|---|---|---|---|
| 5,213,910 A | * | 5/1993 | Yamada | H01M 8/2425 429/457 |
| 5,589,285 A | * | 12/1996 | Cable | H01M 8/0271 429/479 |

(Continued)

FOREIGN PATENT DOCUMENTS

| | | |
|---|---|---|
| CN | 1474883 A | 11/2004 |
| EP | 1316123 B1 | 4/2009 |

(Continued)

OTHER PUBLICATIONS

Machine Translation of JP 08306361 A, dated Nov. 22, 1996, retrieved Feb. 15, 2017.*

(Continued)

*Primary Examiner* — Robert S Carrico
(74) *Attorney, Agent, or Firm* — Abel Law Group, LLP; Thomas Osborn

(57) ABSTRACT

A solid oxide fuel cell with a dense barrier layer formed at or near the outer surface of the top and/or bottom electrode layers in a fuel cell stack. The dense barrier layer (DBL) acts as a seal to prevent gas in the electrode layer (either air in a cathode layer or fuel gas in an anode layer) from leaking out of the stack though the outer surface of the outermost electrode layers. The use of a DBL with porous outer electrode layers reduces the amount of gas escaping the stack and minimizes the chances for leak-induced problems ranging from decreases in performance to catastrophic stack failure.

10 Claims, 4 Drawing Sheets

(51) Int. Cl.
*H01M 8/1213* (2016.01)
*H01M 8/2425* (2016.01)
*H01M 8/124* (2016.01)

(56) References Cited

U.S. PATENT DOCUMENTS

| | | | |
|---|---|---|---|
| 6,783,880 B2 | 8/2004 | Christiansen | |
| 7,422,818 B2 | 9/2008 | Finkenwirth et al. | |
| 7,597,986 B2 | 10/2009 | Haltiner et al. | |
| 7,832,737 B2 | 11/2010 | Chou et al. | |
| 8,459,467 B2 | 6/2013 | Reilly et al. | |
| 2001/0012576 A1 | 8/2001 | Christiansen | |
| 2002/0177031 A1 | 11/2002 | Doshi et al. | |
| 2004/0175607 A1 | 9/2004 | Itoh | |
| 2006/0204815 A1* | 9/2006 | Lam | C25B 9/18 429/465 |
| 2007/0037031 A1 | 2/2007 | Cassidy et al. | |
| 2008/0081223 A1* | 4/2008 | Yasumoto | C04B 41/009 429/532 |
| 2010/0092829 A1* | 4/2010 | Fontaine | C01F 17/0018 429/489 |
| 2011/0052964 A1* | 3/2011 | Kim | H01M 2/1673 429/152 |
| 2012/0251917 A1* | 10/2012 | Son | H01M 8/1213 429/482 |
| 2013/0095412 A1 | 4/2013 | Kwon et al. | |

FOREIGN PATENT DOCUMENTS

| | | |
|---|---|---|
| EP | 1316123 B1 | 11/2009 |
| JP | 08306361 A * | 11/1996 |
| JP | H09-050812 A | 2/1997 |
| JP | H950812 A | 2/1997 |
| JP | 2005259489 A | 9/2005 |
| JP | 2007123005 A | 5/2007 |
| JP | 2010287440 A | 12/2010 |
| KR | 10-0674153 B1 | 1/2007 |
| WO | 03/007413 A1 | 1/2003 |
| WO | 2003007413 A1 | 1/2003 |
| WO | 2008/026802 A1 | 3/2008 |
| WO | 2008026802 A1 | 3/2008 |
| WO | 2009149848 A1 | 6/2009 |
| WO | 2009/149848 A1 | 12/2009 |
| WO | 2010078356 A2 | 7/2010 |
| WO | 2013096756 A1 | 6/2013 |

OTHER PUBLICATIONS

European Supplemental Search Report relating to EP 14817560 dated Nov. 10, 2016, 2 pages.
International Search Report for PCT/US2014/044627, dated Oct. 15, 2014, 13 pages.

* cited by examiner

SOLID OXIDE FUEL CELL HAVING A DENSE BARRIER LAYER

CROSS-REFERENCE TO RELATED APPLICATION(S)

The present application claims priority from U.S. Provisional Application No. 61/841,298, filed Jun. 29, 2013, entitled "Solid Oxide Fuel Cell Having a Dense Barrier Layer," naming inventors Brian Feldman, Craig Adams, and Zachary R. Patterson, which application is incorporated by reference herein its entirety.

FIELD OF THE DISCLOSURE

This disclosure, in general, relates to solid oxide fuel cells or other multilayer porous ceramic devices and, in particular, to a dense barrier layer that reduces gas leakage in such devices.

BACKGROUND

A solid oxide fuel cell (SOFC) is a device that generates electricity by a chemical reaction. FIG. 1 shows a conventional SOFC subcell including a cathode layer 102, an anode layer 106, and an electrolyte layer 104. Fuel cells are typically characterized by their electrolyte material, with SOFCs having a solid oxide or ceramic electrolyte.

During operation of the SOFC, an oxidant, usually air, is fed through a plurality of air channels 120 defined by the cathode 102, while fuel, such as hydrogen gas ($H_2$), is fed through a plurality of fuel channels 121 defined by the anode 106. The oxidant and fuel channels can be oriented at right angles to one another. The anode and cathode layers are separated by an electrolyte layer 104. During operation, the oxidant is reduced to oxygen ions at the cathode. These oxygen ions can then diffuse through the solid oxide electrolyte to the anode where they can electrochemically oxidize the fuel. In this reaction, a water byproduct is given off as well as two electrons. These electrons are transported through the anode to an external circuit (not shown) and then back to the cathode, providing a source of electrical energy in the external circuit.

The flow of electrons in the external circuit typically provides an electrical potential of approximately 1.1 volts. To generate larger voltages, fuel cells are typically arranged in "stacks" composed of a larger number of individual cells with an "interconnect" joining and conducting current between immediately adjacent cells. As described in greater detail below, the stack design shown in FIG. 2 is a flat-plate or "planar" SOFC, in which two separate "cells" are shown arranged in a repeating sequence. The cells are separated by an interconnect 208, 216 which serves to connect each cell in series so that the electricity each cell generates can be combined.

One continuing challenge in fuel cell manufacture is the prevention of gas leaks within and from the fuel cell. Gas leaks are problematic for several reasons. To attain a certain power, a stoichiometric ratio of oxygen to hydrogen greater than or equal to one is required. With a severe leak on the air side, there could be a superfluous amount of hydrogen relative to oxygen and performance of the fuel cell will suffer. Hydrogen or other fuel gas leaks can be even more significant because of the danger of explosion. Further, if the hydrogen leak comes into contact with the cathode material, the cathode itself may be permanently damaged by hydrogen reduction. This not only damages the electrical properties of the cathode layer, but can also cause a volumetric expansion (swelling) of the cathode layer that may result in complete failure of the stack. Lastly, leak of fuel or oxidant could decrease the fuel utilization or air utilization respectively.

Therefore, there is a need for an improved solid oxide fuel cell stack with reduced gas leakage.

SUMMARY OF THE INVENTION

The invention generally is directed to a solid oxide fuel cell with a dense barrier layer formed at or near the outer surface of the top and bottom electrode layers in a fuel cell stack. The dense barrier layer (DBL) acts as a seal to prevent gas in the electrode layer (either air in a cathode layer or fuel gas in an anode layer) from leaking out of the stack though the outer surface of the outermost electrode layers. The use of a DBL with the porous outer cathode layers reduces the amount of air escaping the stack which in turn could reduce the existence of low oxygen partial pressure regions within the stack. This prevents damage to the cathode resulting from reduction of the cathode material. When used with an anode layer, the DBL increases the desirable flow of fuel into the electrodes and also helps prevent a potentially unsafe buildup of fuel gas outside the stack.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

The present disclosure can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system is of high quality and therefore can be used to provide hot water for the home. SOFCs can be particularly useful in areas where electric service is unreliable or non-existent.

As discussed above, it can be very difficult to prevent gas leaks in solid oxide fuel cells. When gas leaks occur, the resulting problems can range from decreases in performance to catastrophic stack failure. Applicants have discovered that in some solid oxide fuel cell stacks, a significant source of gas leakage is the porous electrode layers on the top and bottom of a fuel cell stack.

Figure 2:
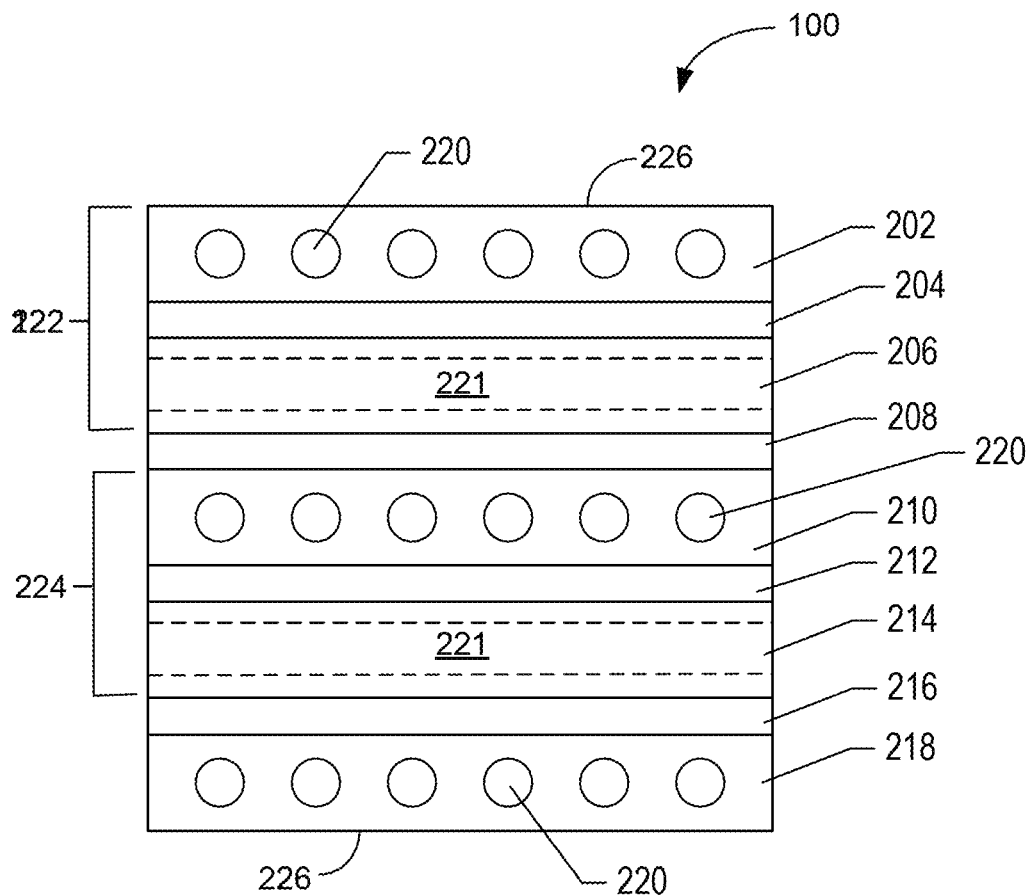
FIG. 2 illustrates an exemplary embodiment of a typical solid oxide fuel cell stack.

FIG. 2 illustrates an exemplary embodiment of a typical solid oxide fuel cell stack. The stack includes electrode layers 202, 206, 210, 214, and 218 separated by intermediate layers 204, 208, 212, and 216. Intermediate layers may include electrolyte layers and interconnect layers. For a solid oxide fuel cell to function, a dense electrolyte layer must separate two porous electrodes. Individual cells are connected together in series by conductive interconnect layers so that the electricity each cell generates can be combined. The stack in FIG. 2 is shown with only two subcells for clarity. In reality, a fuel cell stack can have the number of cells suitable for the particular task of the stack, which will often require many subcells in each stack. Also, FIG. 2 shows a plurality of channels formed in every electrode layer. In some embodiments, however, some or even all of the electrodes may have fewer or no channels, while in some embodiments some or even all of the electrodes may also have more channels.

Each porous electrode layer may also include channels 220. Depending upon the type of electrode, an oxidizer gas or fuel gas flows through channels 220 and ions are transported across the electrolyte layers. Although more complex gases, such as natural gas/propane and air, respectively, can and in many cases are supplied to the cell, the basic requirements are only hydrogen and oxygen. The electrodes are electronic conductors, and are necessary to collect direct current from the cell.

In one particular embodiment, electrode 202 is a cathode and electrode 206 is an anode. Anode 206 and cathode 202 are separated by an electrolyte 204 to form a single solid oxide fuel cell 222, sometimes referred to as a subcell. Stacking cells on top of each other and connecting them via electrical interconnect layers creates a stack. An electrically conductive interconnect layer is formed between an anode layer and a cathode layer of each pair of adjacent cells to connect the cells in series so that the electricity each cell generates can be combined. In the particular embodiment, interconnect layer 208 connects the anode 206 of cell 222 to the cathode 210 of the adjacent cell 224.

The separation of the oxidizer gas in anode 206 and fuel gas in cathode 202 by the electrolyte 204 creates an oxygen partial pressure gradient. This gradient causes oxygen ions to be transported across the electrolyte 204 and to react with the fuel. Similarly, anode 214 is separated from a cathode 210 by another electrolyte 212. Here too, oxygen ions may be transported across electrolyte 212 to cause a potential between cathode 210 and anode 214. The pattern may be repeated multiple times to form a stack with a large number of individual cells. An electrically conductive interconnect layer is formed between an anode layer and a cathode layer of each pair of adjacent stacked cells to connect the cells in series so that the electricity each cell generates can be combined. Increasing the number of cells increases the Z-axis size of a stack. The X and Y axes of a stack can be increased independently of the Z-axis.

Figure 1:
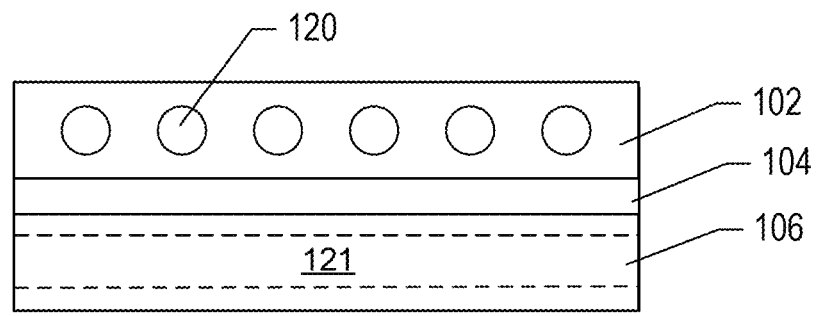
FIG. 1 shows a single subcell in a solid oxide fuel cell.

In some embodiments, there can be an even number of alternating anode and cathode layers in the stack so that the final stack will have a cathode layer as the outermost electrode layer in one direction (on the top of the stack shown in FIG. 2), and an anode layer as the outermost electrode layer in the other direction (on the bottom of the stack in FIG. 2). As used herein, the terms "top" and "bottom" are merely for convenience as the stack can be oriented in any direction. The terms "outer electrode layer" or "outermost electrode layer" or similar will be used herein to refer to the first and last electrode layers in a stack (the top and bottom electrode layers in the orientation of FIGS. 1 and 2).

In some circumstances, it may be desirable to have one more of one type of electrode than the other. For example, it is sometimes desirable to have the two exposed end layers of the stack be cathode layers because the cathode layers are stable in air, while the anode layers will oxidize if exposed to air. It is also sometimes advantageous for to have the same type of electrode layer on the top and bottom of a stack so that there will be symmetry during the manufacturing process. Accordingly, in other embodiments, such as the stack shown in FIG. 2, there can be one more cathode layer than there are anode layers. As a result, both the top electrode layer (in the orientation of FIG. 2) and the bottom electrode layer will be cathode layers. In other embodiments, the reverse can also be true, with one more anode layer than there are cathode layers so that the top and bottom electrodes are both anode layers.

FIG. 2 shows an embodiment with five total electrode layers. Separating each adjacent pair of the five electrode layers is either an electrolyte or an interconnect. For a 2-cell stack with a total of five electrode layers, there are two electrolyte layers and two interconnect layers. The anode and cathode layers are intentionally porous enough to allow gas flow within the layers' structures, although both layers also preferably have channels for gas flow into the electrodes. The electrolyte and interconnect layers are preferably denser than the electrode layers and are largely gas impermeable. The top and bottom surfaces (the outermost surfaces of the top and bottom cathode layers 202 and 218 in FIG. 2) are referred to as the current collector surfaces 226, as they are the locations at which current is drawn ("collected") from the stack.

For a fuel cell stack such as the one shown in FIG. 2 (having cathode layers as the top and bottom electrode layers in the stack) measurements performed by Applicants showed that the "flow-through" (defined as the volume of gas exiting the stack through the channels divided by the volume of gas metered to the stack) was surprisingly small for the sum of the cathode layers. While the flow-through for the sum of the anode layers measured upwards of 90-95%, the cathode achieved only 30-50%. When other sources of leakage were eliminated, it was discovered that the majority of air leaking out of the stack was escaping through the collector surfaces of the stack completely independent of the manifold system and seals.

Figure 3:
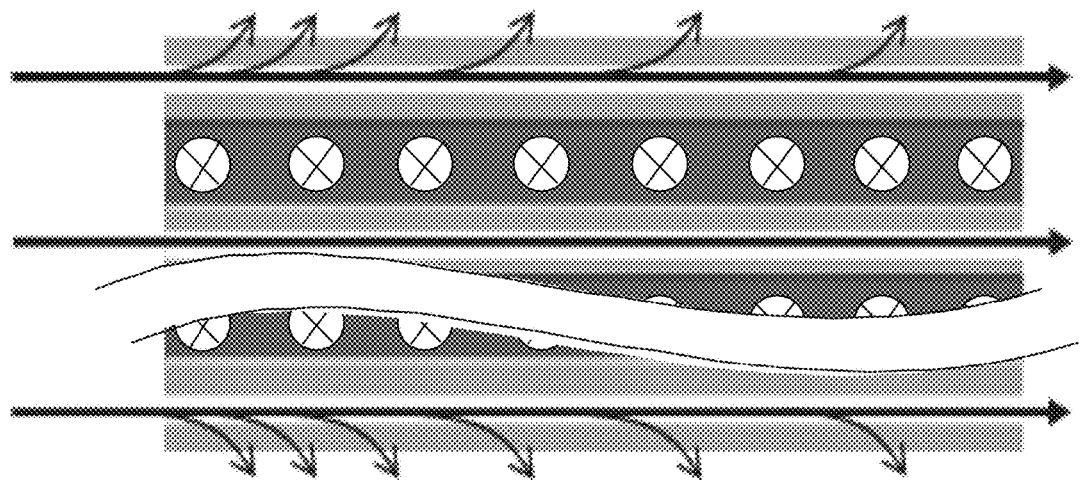
FIG. 3 is a graphical representation showing the gas flow through the top and bottom electrodes in a prior art fuel cell.

The leak phenomenon discovered by Applicants is shown in FIG. 3. The SOFC in FIG. 3 is a five electrode layer stack with three cathode layers and two anode layers. The electrode layers are separated by either electrolyte or interconnect layers as in FIG. 2. Applicants discovered that a large percentage of the air flowing into the channels in the top and bottom cathode layers was flowing through the porous cathode material and actually leaking out of the stack through the upper and lower collector surfaces, causing stacks to fail.

This leak is believed to be due to a lack of dense surface layers to inhibit gas flow out of the porous electrode layers. The leak is exacerbated by higher aspect ratio gas channels due to the increase in backpressure. The interior intermediate layers in between the electrode layers in a SOFC are either a dense electrolyte layer or a dense interconnect layer. For electrodes with dense intermediate layers on either side, the gas is largely prevented from flowing out of the electrode layer except through the channels. However, the outer electrode layers (i.e., the top and bottom electrode layers in a stack) only have a dense layer (either electrolyte or interconnect) on their interior side. The porous electrodes used in SOFC are porous enough that air flowing in the channels can pass into the porosity of the electrode layer and escape from the SOFC through the outer (external) surfaces of the top and bottom electrode layers.

The size and shape of the gas channels and the x-y dimensions of the stack impact the backpressure of the electrode layer. For example, for channels of a given diameter, as the length increases the backpressure increases. Thus, there is less impetus for the fuel or oxidant to flow through the entire length of the channel as intended. At higher backpressures, the path of least resistance for the gas is to flow through the electrode layer's porosity to the outer exterior surface.

Because electrochemical considerations require thin electrode layers for optimal performance, it is not practical to increase the gas channel diameter to lower backpressure. Embodiments of the present invention therefore address the problem by using a dense barrier layer ("DBL") on or near the outer exterior surfaces of the top and bottom electrodes in the stack to eliminate the undesirable path of least resistance.

Figure 4:
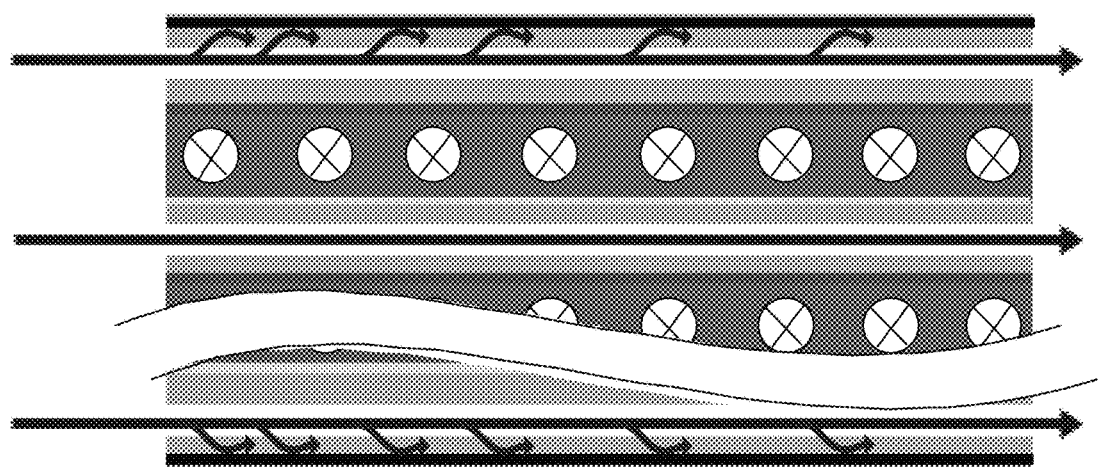
FIG. 4 is a graphical representation showing the gas flow through the top and bottom electrodes in a fuel cell according to embodiments of the present invention.

FIG. 4 is a graphical representation showing the gas flow through the top and bottom electrodes in a fuel cell according to embodiments of the present invention. The fuel cell stack in FIGS. 3 and 4 can include any desired number of cells, but only the top and bottom of the stack are shown here for clarity. In a particular embodiment, a solid oxide fuel cell can include a first porous electrode layer; an intermediate layer over the first porous electrode layer, the intermediate layer comprising either an electrolyte layer or an interconnect layer; a second porous electrode layer over the intermediate layer, the second porous electrode layer defining at least one gas passage and having an outer surface forming a current collector surface for the fuel cell; and a dense barrier layer deposited over the surface of the second porous electrode layer opposite the intermediate layer or formed within the second porous electrode layer, the dense barrier layer forming a seal preventing gas flow within the second porous electrode layer from escaping through the outer surface of the second porous electrode layer. In some embodiments, the first porous electrode layer is an anode layer and the second porous electrode layer is a cathode layer; while in other embodiments the first porous electrode layer is a cathode layer and the second porous electrode layer is an anode layer.

A preferred dense barrier layer is a gas impermeable layer that seals the outer electrode layers. Preferably, the seal is a hermetic seal. As used herein, a hermetic seal is defined as a seal that will allow less than 10% of the gas flowing through the electrode layer to escape through the outer exterior surface of the electrode. In some embodiments, the DBL comprises a gas-tight ceramic layer. In other embodiments, the DBL comprises a conductive metal layer. Preferred embodiments of a DBL prevent more than 50%, more than 75%, more than 80%, more than 85%, more than 90%, more than 95%, more than 98%, or more than 99% of a gas flowing through the electrode gas channel from leaking out through the electrode exterior surface. Preferably the DBL has a hermeticity of at least 50%, at least 75%, at least 80%, at least 85%, at least 90%, at least 95%, at least 98%, or at least 99%.

In addition to gas impermeability, a preferred DBL should also have a coefficient of thermal expansion (CTE) that matches the CTE of the electrode layer. Undesirable thermal stress and cracking may result from a CTE mismatch between the dense barrier layer and the electrode layer in direct contact with the DBL. Preferably, the DBL has a CTE that is within about ±5 ppm/° C., about ±2 ppm/° C., or about ±0 ppm/° C. of the CTE of the electrode layer.

A preferred DBL should also have sufficient electronic conductivity to largely match the conductivity of the electrode layer. The conductivity of the DBL should be greater than about 5 S/cm.

In preferred embodiments, the DBL has at least one material component common to the electrode layer. Preferably, the DBL has the same chemical composition as the electrode layer and/or has a lower porosity than the electrode layer. For example, a preferred DBL has a porosity of not greater than 10 vol %, not greater than 5 vol %, or not greater than 3 vol %.

In some embodiments, the DBL has the same chemical composition as the electrode layer but has a greater conductance. A preferred DBL can also serve to even out the current density drawn from the closest cell within the stack, effectively lowering the spreading resistance of the current collection. High current density regions can occur due to presence of gas channels and can irreparably damage the stack due to local joule heating. The porous structure of the bulk electrodes is not ideal for drawing current in an even manner. The contiguous nature of the dense barrier layer will be superior to the surrounding bulk electrode in terms of its connectivity and resultant distribution of current.

In order to prevent gas from escaping through the outer surface of the top and bottom electrode layers, while still allowing gas to pass through the channels and/or porosity of the top and bottom electrode layers, the DBL should be formed at the outer surface of the electrode. In some embodiments, the DBL will be formed directly on the exterior surface of the electrode layer (the surface opposite the intermediate layer in contact with that top or bottom layer). In other embodiments, the DBL will be formed within the electrode bulk so that there is electrode material on either side of the DBL. In embodiments where there are gas channels formed within the electrode, the DBL should be formed on the side of the gas channels opposite the intermediate layer and between the gas channels and the exterior surface of the electrode. In that case it will be preferable for the DBL to be as close to the free (exterior) surfaces of the stack as possible. As used herein, the term "adjacent electrode," when used with respect to the DBL, will refer to this outer electrode that is sealed by the DBL even though the DBL is formed within such an outer electrode in some embodiments.

The actual composition of a preferred DBL will thus depend on whether the DBL is being applied on or within an anode layer or a cathode layer, and further upon the actual composition of the anode or cathode layer. For example, where the outer electrode layer is a cathode layer comprising a lanthanum-manganite based material and/or a lanthanum-ferrite based material, a preferred DBL could comprise $(La_{1-x}Sr_x)_yMnO_3$, wherein x is not greater than about 0.5, y is not greater than about 1.0, and the ratio of La/Mn is not greater than about 1.0.

In some embodiments, the DBL comprises LSM and/or YSZ. In a particular embodiment, the DBL can include particles having a $d_{50}$ of not greater than 10 microns, such as not greater than 5 microns, not greater than 3 microns, or not greater than 2 microns. The DBL can include particles that have a $d_{50}$ of at least 0.01 microns. In a particular embodiment, the DBL comprises sintered LSM, where the LSM comprised particle finer than the bulk cathode particles; for example where the LSM had a $d_{50}$ particle size of no more than 10 microns, no more than 5 microns, no more than 3 microns, or no more than 2 microns. A bather layer comprised of LSM particles that are finer than the particle in the cathode bulk material will sinter more than bulk material and will preferably become sufficiently dense to block gas flow, while still adequately conducting electricity and while matching the CTE of the surrounding or underlying cathode bulk material. In an embodiment, the DBL can include YSZ particles, wherein the YSZ particles have a d50 of not greater than 10 microns, such as not greater than 5 microns, not greater than 3 microns, not greater than 2 microns, or even not greater than 1 micron.

Where the outer electrode layer is an anode layer comprising a cermet material, a preferred DBL could comprise nickel-YSZ. Alternatively, a preferred DBL could comprise lanthanum titanate, lanthanum chromite, strontium titanate, and/or lanthanum strontium titanate.

In accordance with an embodiment, a green DBL can have an average thickness expressed as a green $DBL/E_{d50}$ ratio, which can be defined as a ratio of the average thickness of the green DBL to the particle size $d_{50}$ of an adjacent porous electrode layer, such as a cathode bulk (CB) layer. In an embodiment, a green DBL can include a particular green $DBL/E_{d50}$ ratio configured to provide gas impermeability and resist deformation or cracking. For example, the green $DBL/E_{d50}$ ratio of the green DBL may be limited at maximum or minimum values to provide gas impermeability while also resisting deformation or cracks that can result during formation (e.g., sintering or pressing). A green $DBL/E_{d50}$ ratio of greater than 5 may not adequately resist cracks that can result during formation. Conversely, a green $DBL/E_{d50}$ ratio of less than 1 may not adequately resist deformation or puncturing that can result during formation. Although not wishing to be bound to any particular theory, the deformation that can result during formation of a green DBL having a $DBL/E_{d50}$ ratio of less than 1 may be due to large particles of an adjacent layer (e.g., cathode bulk layer) that can cause deforming or even puncturing of the green DBL during a sintering or pressing process. For example, the green DBL can have a green $DBL/E_{d50}$ ratio of at least 1, such as at least 2. In a non-limiting embodiment, the green DBL can have a green $DBL/E_{d50}$ ratio of not greater than 5, such as not greater than 4, or not greater than 3. It will be appreciated that the green DBL can have a green $DBL/E_{d50}$ ratio within a range of any minimum or maximum value noted above. For example, in a particular embodiment a green DBL can have a green $DBL/E_{d50}$ ratio that is within a range of 2 to 3.

A DBL in accordance with embodiments herein can further include one or more transition layers (TL) disposed thereon. The one or more transition layers can be in direct contact with a DBL substantially along the entire length and width of the DBL. The length of the DBL can be defined as the longest dimension of the DBL, and the width can be defined as the second longest dimension of the DBL. In an embodiment, the DBL and the one or more transition layers can be in a "sandwich" configuration, in which a first transition layer is on one side of the DBL, and another transition layer is on another side of the DBL opposite the first transition layer.

Materials for the transition layer can include similar or even identical materials to those of the DBL, cathode, or anode according to embodiments described herein, or any combination thereof. In a particular embodiment, the transition layer can include a mixture of LSM and YSZ powders. Further, the transition layer can have a particle size $d_{50}$ that is similar or even identical to those of the DBL, cathode, or anode according to embodiments described herein, or any combination thereof.

According to an embodiment, a green transition layer (TL) can have a particular average thickness expressed as a green $TL/E_{d50}$ ratio, which can be defined as a ratio of the average thickness of the green TL to the particle size $d_{50}$ of an adjacent electrode layer, such as a cathode bulk (CB) layer. For example, a green TL can have a green $TL/E_{d50}$ ratio that is not greater than about 10, such as not greater than 8, not greater than 6, not greater than 4, or even not greater than 2. In a non-limiting embodiment, a green TL can have a green $TL/E_{d50}$ ratio that is at least about 0.1, such as at least 0.5, at least 1, or at least 1.5. It will be appreciated that a green TL can have a green $TL/E_{d50}$ ratio that is within a range of any minimum or maximum value indicated herein. For example, in a particular embodiment, a green TL can have a green $TL/E_{d50}$ ratio that is within a range of 1 to 2.

In a particular embodiment, the transition layer (TL) may include powder(s) having a maximum $d_{50}$ that is chosen to decrease the possibility of deforming or puncturing the DBL during forming, which possibility increases with a lower value green $TL/CB_{d50}$ ratio. In an embodiment, the transition layers may be chosen to have average particle sizes that are "intermediate" or between the average particle sizes $d_{50}$ of the DBL and an adjacent layer, such as an electrode layer, or more particularly a cathode bulk (CB) layer. Although not wishing to be bound to any particular theory, it is believed that choosing an intermediate particle size ($d_{50}$) will mitigate larger particles of an adjacent layer (e.g., CB layer) puncturing or deforming the DBL.

In accordance with an embodiment, a green DBL can have an average thickness expressed as a green $DBL/TL_{d50}$ ratio, which can be defined as a ratio of the average thickness of the green DBL to the particle size $d_{50}$ of the transition layer (TL). For example, the green DBL can have a green $DBL/TL_{d50}$ ratio of at least 1, such as at least 10, at least 20, at least 30, or at least 40. In a non-limiting embodiment, the green DBL can have a green $DBL/TL_{d50}$ ratio of not greater than 100, such as not greater than 80, not greater than 60, or not greater than 50. It will be appreciated that the green DBL can have a green $DBL/TL_{d50}$ ratio within a range of any minimum or maximum value noted above. For example, in a particular embodiment a green DBL can have a green $DBL/TL_{d50}$ ratio that is within a range of 40 to 50.

In accordance with another embodiment, the average thickness of a finally formed (e.g., fired, sintered, or pressed) DBL can have a particular thickness expressed as a fired $DBL/E_{d50}$ ratio, which can be defined as a ratio of the average thickness of the finally-formed DBL to the particle size $d_{50}$ of an adjacent electrode layer, such as a cathode bulk (CB) layer. For example, a finally-formed DBL can have a fired $DBL/E_{d50}$ ratio that is not greater than about 5, such as not greater than 4, not greater than 3, not greater than 2, or even not greater than 1. In a non-limiting embodiment, a finally-formed DBL can have a fired $DBL/E_{d50}$ ratio that is at least about 0.1, such as at least 0.2, at least 0.3, at least 0.4, or at least 0.5. It will be appreciated that a finally-formed DBL can have a fired $DBL/E_{d50}$ ratio that is within a range of any minimum or maximum value indicated herein. For example, in a particular embodiment, a finally-formed DBL can have a fired $DBL/E_{d50}$ ratio that is within a range of 0.5 to 1.

According to an embodiment, a finally-formed transition layer (TL) can have a particular average thickness expressed as a fired $TL/E_{d50}$ ratio, which can be defined as a ratio of the average thickness of the finally-formed TL to the particle size $d_{50}$ of an adjacent electrode layer, such as a cathode bulk (CB) layer. For example, a finally-formed TL can have a fired $TL/E_{d50}$ ratio that is not greater than about 10, such as not greater than 8, not greater than 6, not greater than 4, or even not greater than 2. In a non-limiting embodiment, a green TL can have a green $TL/E_{d50}$ ratio that is at least 0.1, such as at least 0.2, at least 0.5, or at least 1, or at least 5. It will be appreciated that a green TL can have a green $TL/E_{d50}$ ratio that is within a range of any minimum or maximum value indicated herein. For example, in a particular embodiment, a green TL can have a green $TL/CB_{d50}$ ratio that is within a range of 0.5 to 1.

In accordance with an embodiment, a finally-formed DBL can have an average thickness expressed as a fired $DBL/TL_{d50}$ ratio, which can be defined as a ratio of the finally-formed DBL average thickness to the transition layer (TL) particle size $d_{50}$. For example, the finally-formed DBL can have a fired $DBL/TL_{d50}$ ratio of at least 1, such as at least 10, at least 20, at least 30, or at least 40. In a non-limiting embodiment, the green DBL can have a green $DBL/TL_{d50}$ ratio of not greater than 100, such as not greater than 80, not greater than 60, or not greater than 50. It will be appreciated that the green DBL can have a green $DBL/TL_{d50}$ ratio within a range of any minimum or maximum value noted above. For example, in a particular embodiment a green DBL can have a green $DBL/TL_{d50}$ ratio that is within a range of 40 to 50.

Fuel cell systems of the invention can be made by any suitable method known in the art. Any suitable anode and cathode materials known in the art can be used in the invention.

Materials for the cathode can include lanthanum manganite materials. The cathode can be made of a doped lanthanum manganite material, giving the cathode composition a perovskite type crystal structure. Accordingly, the doped lanthanum manganite material has a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the cathode layer may include a lanthanum strontium manganate material, known generally as LSM.

According to one embodiment, the doped lanthanum manganite cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganite composition represents the amount of dopant substituted for La within the structure. According to one embodiment, x is not greater than about 0.5, such as not greater than about 0.4 or 0.3. Still, the amount of dopant provided within the cathode material may be less, such that x is not greater than about 0.2, or still 0.1, and particularly within a range of between about 0.4 and 0.05.

Alternatively, or additionally, the material of the cathode can include a La-ferrite based material. Typically, the La-ferrite based material can be doped with one or more suitable dopants, such as Sr, Ca, Ba, Mg, Ni, Co or Fe. Examples of doped La-ferrite based materials include LaSrCo-ferrite (LSCF) (e.g., $La_{1-g}Sr_qCo_{1-j}Fe_jO_3$) where each of q and j independently is equal to or greater than 0.1, and equal to or less than 0.4 and (La+Sr)/(Fe+Co) is in a range of between about 1.0 and about 0.90 (molar ratio). In one specific embodiment, the cathode can include a mixture of a La-manganite and La-ferrite material. For example, the cathode can include a LaSr-manganite (LSM) (e.g., $La_{1-k}Sr_kMnO_3$) and a LaSrCo-ferrite (LSCF). Common examples include $(La_{0.8}Sr_{0.2})_{0.98}Mn_{3+-\Delta}$ ($\Delta$ is equal to or greater than zero, and equal to or less than 0.3) and $La_{0.6}Sr_{0.4}Co_{42}Fe_{0.8}O_3$.

The cathode layer may have an average thickness of not less than about 0.10 mm, such not less than about 0.15 mm, not less than about 0.20 mm, or even not less than about 0.25 mm. Further, the cathode layer may have an average thickness that is not greater than about 2 mm, such as not greater than about 1.9 mm, not greater than about 1.8 mm, not greater than about 1.7 mm, not greater than about 1.6 mm, or even not greater than about 1.5 mm. It will be appreciated that the cathode layer can have an average thickness within a range including any of the minimum and maximum values noted above.

The cathode layer may be a porous layer, having porosity within a range between about 25 vol % and about 60 vol %, for the total volume of the cathode layer. The cathode layer can also include channels, which can be utilized to deliver oxidant to the SOFC article. The channels may be arranged in a particular manner, such as in a regular and repeating pattern throughout the volume of the cathode layer. Any suitable techniques may be used to form the porosity and/or channels, including for example, incorporating shaped fugitives, embossing, cutting channels in tapes and then laminating the tapes to define channels, using extrusion through preforms, using patterned rolls in roll compaction.

The anode layer may include a cermet material, that is, a combination of a ceramic and metallic material. Some suitable metals can include transition metal species, including for example, nickel or copper. The anode can include an ionic conductor, including for example, a ceramic material, and particularly, an oxide material. For example, the anode may be formed with nickel and a zirconia-based material, including for example, yttria-stabilized zirconia. Alternatively, the anode can include a ceria-based material, including for example, gadolinium oxide-stabilized ceria. The nickel can be produced through the reduction of nickel oxide included in the anode green material. Alternatively, it will be appreciated that certain other types of oxide materials may be used in the anode layer, such as titanates, manganites, chromites, a combination thereof, and the like. It will be appreciated, that such oxides may also be perovskite materials.

The anode layer can be a thin and substantially planar layer of material. The anode layer can have an average thickness that is greater than the average thickness of the interconnect layer. For example, anode layer can have an average thickness of at least about 100 microns, such as at least about 300 microns, at least about 500 microns, at least about 700 microns, or even at least about 1 mm. Still, the anode layer can have an average thickness of not greater than about 5 mm, such as not greater than about 2 mm, or even not greater than about 1.5 mm. It will be appreciated that the average thickness of the anode layer can have an average thickness within a range between any of the minimum and maximum values noted above.

The anode layer can be a porous layer, having porosity within a range between about 25 vol % and about 60 vol %, for the total volume of the anode layer. The porosity may be in the form of channels, which can be utilized to deliver fuel to the SOFC article. The channels may be arranged in a particular manner, such as in a regular and repeating pattern throughout the volume of the anode layer. Any suitable techniques may be used to form the porosity and/or channels, including for example, incorporating shaped fugitives, embossing, cutting channels in tapes and then laminating the tapes to define channels, using extrusion through preforms, using patterned rolls in roll compaction.

Any suitable electrolyte material known in the art can be used for the electrolyte of the invention. Preferably, electrolyte is a solid electrolyte. Specific examples include $ZrO_2$ based materials, such as $Sc_2O_3$-doped $ZrO_2$, $Y_2O_3$-doped $ZrO_2$, $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$, and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.5}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$).

Any suitable thickness of electrolyte can be employed in the invention. In one specific embodiment, the thickness of electrolyte is in a range of between about 5 microns and about 20 microns, such as between about 10 microns and about 15 microns.

The interconnect layer can include a ceramic material, including an inorganic material. In particular, the interconnect layer can include an oxide material, and more particularly, can be a chromite or titanate material. More particularly, the interconnect layer can include an element selected from the group consisting of lanthanum (La), manganese (Mn), strontium (Sr), titanium (Ti), niobium (Nb), calcium (Ca), gallium (Ga), cobalt (Co), yttria (Y), and a combination thereof. In certain instances, the interconnect layer 208, 216 can include a chromium oxide-based materials, nickel oxide-based materials, cobalt oxide-based materials, and titanium oxide-based materials (e.g., lanthanium strontium titanate). In particular, the interconnect layer 208 can be made of a material, such as $LaSrCrO_3$, $LaMnCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$, $CaCrO_3$, and a combination thereof. In particular, the interconnect layer 208 can comprise LST (or YST), and may consist essentially of Nb doped LST, such as, $La_{0.2}Sr_{0.8}TiO_3$, having one or more dopants. It will be appreciated, that the interconnect material may include an A-site deficient material, wherein for example, the lattice sites typically occupied by lanthanum or strontium cations are vacant, and thus the material has a non-stoichiometric composition.

The interconnect layer can be a particularly thin, planar layer of material. For example, the interconnect layer can have an average thickness of not greater than about 1 mm, such as not greater than about 500 microns, such as not greater than about 300 microns, not greater than about 200 microns, not greater than about 100 microns, not greater than about 80 microns, not greater than about 50 microns, or even not greater than about 25 microns. Still, the interconnect layer can have an average thickness of at least about 1 micron, such as at least about 2 microns, at least about 5 microns, at least about 8 microns, or at least about 10 microns. It will be appreciated that the average thickness of the interconnect layer can have an average thickness within a range between any of the minimum and maximum values noted above.

In order to form a solid oxide fuel cell as shown in FIG. 2, each of the layers can be formed individually before assembling the layers in the stack. That is, the layers can be formed separately as green layers and assembled together into the stack. Alternatively, the layers may be formed in green state in succession on each other, such that a first green electrolyte layer is formed, and thereafter, a green electrode layer can be formed overlying the green electrolyte layer, and thereafter, a green interconnect layer can be formed overlying the green electrode layer. The method further including sintering the green SOFC cell in a single sintering process to form a sintered SOFC cell.

Reference herein to "green" articles is reference to materials that have not undergone sintering or pressing to affect densification or grain growth. A green article is an unfinished article that may be dried and have low water content, but is unfired. A green article can have suitable strength to support itself and other green layers formed thereon.

The layers described according to the embodiments herein can be formed through techniques including, but not limited to, casting, deposition, printing, extruding, lamination, die-pressing, gel casting, spray coating, screen printing, roll compaction, injection molding, and a combination thereof. In one particular instance, each of the layers can be formed via screen printing. In another embodiment, each of the layers can be formed via a tape casting process.

Items

Item 1. A solid oxide fuel cell, comprising: a first porous electrode layer; an intermediate layer over the first porous electrode layer, the intermediate layer comprising either an electrolyte layer or an interconnect layer; a second porous electrode layer over the intermediate layer, the second porous electrode layer defining at least one gas passage and having an outer surface forming a current collector surface for the fuel cell; and a dense barrier layer formed on the surface of the second porous electrode layer opposite the intermediate layer or formed within the second porous electrode layer, the dense barrier layer forming a gas seal preventing gas flow within the second porous electrode layer from escaping through the outer surface of the second porous electrode layer.

Item 2. The solid oxide fuel cell of item 1 in which the first porous electrode layer is an anode layer and the second porous electrode layer is a cathode layer.

Item 3. The solid oxide fuel cell of item 1 in which the first porous electrode layer is a cathode layer and the second porous electrode layer is an anode layer.

Item 4. A fuel cell assembly, comprising at least one porous electrode layer of a first type, at least one porous electrode layer of a first type stacked on the at least one porous electrode layer of a first type and a dense barrier layer formed at an outer surface of the uppermost electrode layer, the dense barrier layer preventing gas flow through the porous electrode layer from escaping through the outer surface of the electrode layer.

Item 5. The fuel cell assembly of item 4 in which: the total number of layers of a porous electrode of a first type=n; the total number of layers of a porous electrode of a second type=n+1; the layers of a porous electrode of a first type and layers of a porous electrode of a second type are arranged as alternating layers in a stack, with layers of a porous electrode of a second type being the top and bottom layers in the stack.

Item 6. The fuel cell assembly of item 4 or item 5 in which the porous electrode layer of a first type is an anode layer and the porous electrode layer of a second type is a cathode layer.

Item 7. The fuel cell assembly of item 4 or item 5 in which the porous electrode layer of a first type is a cathode layer and the porous electrode layer of a second type is an anode layer.

Item 8. The solid oxide fuel cell or fuel assembly of any one of the preceding items in which the solid oxide fuel cell or fuel cell assembly includes a plurality of subcells, each subcell including an anode, a cathode, an electrolyte partitioning the anode and cathode, and further including an interconnect between the anode of one subcell and the cathode of another subcell.

Item 9. The solid oxide fuel cell or fuel cell assembly of item 8 in which the dense barrier layer is compositionally distinct from the interconnect layer.

Item 10. A multilayer porous ceramic device, comprising: a first electrode layer; an electrolyte layer overlying the first electrode layer; a second electrode layer overlying the electrolyte layer; an interconnect layer disposed between the second electrode layer and a third electrode layer; and a dense barrier layer formed at the outer surface of the third electrode layer, the dense barrier layer being compositionally distinct from the interconnect layer and having a density that is high enough to prevent gas flowing through the third electrode layer from escaping through the dense barrier layer.

Item 11. The multilayer porous ceramic device of item 10 comprising a solid oxide fuel cell assembly.

Item 12. The multilayer porous ceramic device of item 10 comprising a solid oxide electrolyzer.

Item 13. The multilayer porous ceramic device of any of items 10-12 in which the first and third electrode layers are cathode layers and the second electrode layer is an anode layer.

Item 14. The multilayer porous ceramic device of any of items 10-12 in which the first and third electrode layers are anode layers and the second electrode layer is a cathode layer.

Item 15. The solid oxide fuel cell, fuel cell assembly, or multilayer porous ceramic device of any one of the preceding items in which the electrode layers have a porosity that allows gas to flow through the electrode layers.

Item 16. The solid oxide fuel cell, fuel cell assembly, or multilayer porous ceramic device of any one of the preceding items in which the electrode layers define channels for gas flow apart from porosity of the electrode layers.

Item 17. The solid oxide fuel cell, fuel cell assembly, or multilayer porous ceramic device of any one of the preceding items in which the dense barrier layer comprises a gas-tight ceramic layer.

Item 18. The solid oxide fuel cell, fuel cell assembly, or multilayer porous ceramic device of any one of the preceding items in which the dense barrier layer comprises a conductive metal layer.

Item 19. The solid oxide fuel cell, fuel cell assembly, or multilayer porous ceramic device of any one of the preceding items in which the dense barrier layer prevents more than 50%, more than 75%, more than 80%, more than 85%, more than 90%, more than 95%, more than 98%, or more than 99% of a gas flowing through an outermost electrode layer from leaking out through the outer surface of the electrode layer.

Item 20. The solid oxide fuel cell, fuel cell assembly, or multilayer porous ceramic device of any one of the preceding items in which the dense barrier layer has a hermeticity of at least 50%, at least 75%, at least 80%, at least 85%, at least 90%, at least 95%, at least 98%, or at least 99%.

Item 21. The solid oxide fuel cell, fuel cell assembly, or multilayer porous ceramic device of any one of the preceding items in which a dense barrier layer has a CTE that is within about $\pm 5$ ppm/$^\circ$ C., about $\pm 2$ ppm/$^\circ$ C, about $\pm 1$ ppm/$^\circ$ C. or about $\pm 0.5$ ppm/$^\circ$ C. of the CTE of the adjacent electrode layer.

Item 22. The solid oxide fuel cell, fuel cell assembly, or multilayer porous ceramic device of any one of the preceding items in which the dense barrier layer has the same chemical composition as the adjacent electrode layer but has greater conductance.

Item 23. The solid oxide fuel cell, fuel cell assembly, or multilayer porous ceramic device of any one of the preceding items in which the dense barrier layer has the same chemical composition as the adjacent electrode layer but has a lower porosity.

Item 24. The solid oxide fuel cell, fuel cell assembly, or multilayer porous ceramic device of any one of the preceding items in which the dense barrier layer has at least one material component common to the adjacent electrode layer.

Item 25. The solid oxide fuel cell, fuel cell assembly, or multilayer porous ceramic device of any one of the preceding items in which the adjacent electrode layer is a cathode layer comprising a lanthanum-manganite based material and/or a lanthanum-ferrite based material.

Item 26. The solid oxide fuel cell, fuel cell assembly, or multilayer porous ceramic device of any one of the preceding items in which the adjacent electrode layer is a cathode layer comprising $(La_{1-x}Sr_x)_yMnO_3$, wherein x is not greater than about 0.5, y is not greater than about 1.0, and the ratio of La/Mn is not greater than about 1.0.

Item 27. The solid oxide fuel cell, fuel cell assembly, or multilayer porous ceramic device of any one of the preceding items in which the dense barrier layer comprises $(La_{1-x}Sr_x)O_yMnO_3$, wherein x is not greater than about 0.5, y is not greater than about 1.0, and the ratio of La/Mn is not greater than about 1.0.

Item 28. The solid oxide fuel cell, fuel cell assembly, or multilayer porous ceramic device of any one of the preceding items in which the dense barrier layer comprises LSM.

Item 29. The solid oxide fuel cell, fuel cell assembly, or multilayer porous ceramic device of any one of the preceding items in which the dense barrier layer comprises sintered LSM, wherein the LSM had a $d_{50}$ particle size of no more than 10 microns, 5 micron, 3 microns or 2 microns.

Item 30. A The solid oxide fuel cell, fuel cell assembly, or multilayer porous ceramic device of any one of the preceding items in which the dense barrier layer comprises LSM and YSZ.

Item 31. The solid oxide fuel cell, fuel cell assembly, or multilayer porous ceramic device of any one of the preceding items in which the adjacent electrode layer is an anode layer comprising a cermet material.

Item 32. The solid oxide fuel cell, fuel cell assembly, or multilayer porous ceramic device of any one of the preceding items in which the adjacent electrode layer is an anode layer comprising nickel-YSZ.

Item 33. The solid oxide fuel cell, fuel cell assembly, or multilayer porous ceramic device of any one of the preceding items in which the dense barrier layer comprises nickel-YSZ.

Item 34. The solid oxide fuel cell, fuel cell assembly, or multilayer porous ceramic device of any one of the preceding items in which the dense barrier layer comprises lanthanum titanate, lanthanum chromite, strontium titanate, and/or lanthanum strontium titanate.

Item 35. The solid oxide fuel cell, fuel cell assembly, or multilayer porous ceramic device of any one of the preceding items in which the dense barrier layer has a porosity of not greater than 10 vol %, not greater than 5 vol %, or not greater than 3 vol %.

Item 36. The solid oxide fuel cell, fuel cell assembly, or multilayer porous ceramic device of Item 35 in which the dense barrier layer is formed at the outer surface of an electrode layer, the electrode layer having a porosity of 25 vol % to 60 vol %.

Item 37. The solid oxide fuel cell, fuel cell assembly, or multilayer porous ceramic device of Item 35 in which the dense barrier layer is formed at the outer surface of a cathode layer, the cathode layer having a porosity of 25 vol % to 40 vol %.

Item 38. The solid oxide fuel cell, fuel cell assembly, or multilayer porous ceramic device of Item 35 in which the dense barrier layer is formed at the outer surface of an anode layer, the anode layer having a porosity of 30 vol % to 55 vol %.

Item 39. The solid oxide fuel cell, fuel cell assembly, or multilayer porous ceramic device of any one of the preceding items in which the dense barrier layer has a porosity that is less than the porosity of the adjacent electrode layer.

EXAMPLE 1

In a first example, the DBL layer was formed using a tape casting process, in which the DBL green tape had the following specifications: 50% of 1.4 micron $d_{50}$ LSM and 50% of 0.8 micron $d_{50}$ YSZ. The presence of YSZ decreases the electrical conductivity of the DBL to some extent, but does not significantly affect the CTE. The DBL layer was formed as a green tape cast layer having a thickness of 50-60 microns. This green DBL tape was used in a two-cell stack comprised of five electrode layers with a cathode layer as both the top and the bottom electrode layers in the stack. The DBL green tape was placed within the top cathode layer above the upper cathode gas channels and within the bottom cathode layer below the lower cathode gas channels. The barrier layer was placed at approximately the same distance from the channels as the adjacent intermediate layer (whether an interconnect or electrolyte layer).

In an example, ceramic powder mixtures are dispersed into aqueous slurries. These slurries are tape cast to varied thicknesses. Each of the layers can be formed individually—that is, the layers can be formed separately (e.g., as green layers). These layers can then be laminated together via heat and pressure into a green stack. Alternatively, the layers may be formed (e.g., in green state) in succession on each other. One of these layers is the dense barrier layer, placed near or at the top and/or bottom surfaces. Finally, the stack unit is co-sintered at a maximum temperature between 1200° C. and 1400° C. and a maximum pressure from 0 to 20 MPa to form a sintered SOFC stack. The thickness of the finally-formed DBL layer was between 20-30 microns. The electrode layer containing the dense barrier layer may undergo a heat treatment prior to co-sintering. The stack is subsequently machined to final dimensions. A glass-ceramic coating is applied to the exterior lateral faces to achieve a hermetic seal. The stack is then mounted in an apparatus that can deliver hydrogen to the anode layer and air to the cathode layer for electrochemical testing.

Figure 5:
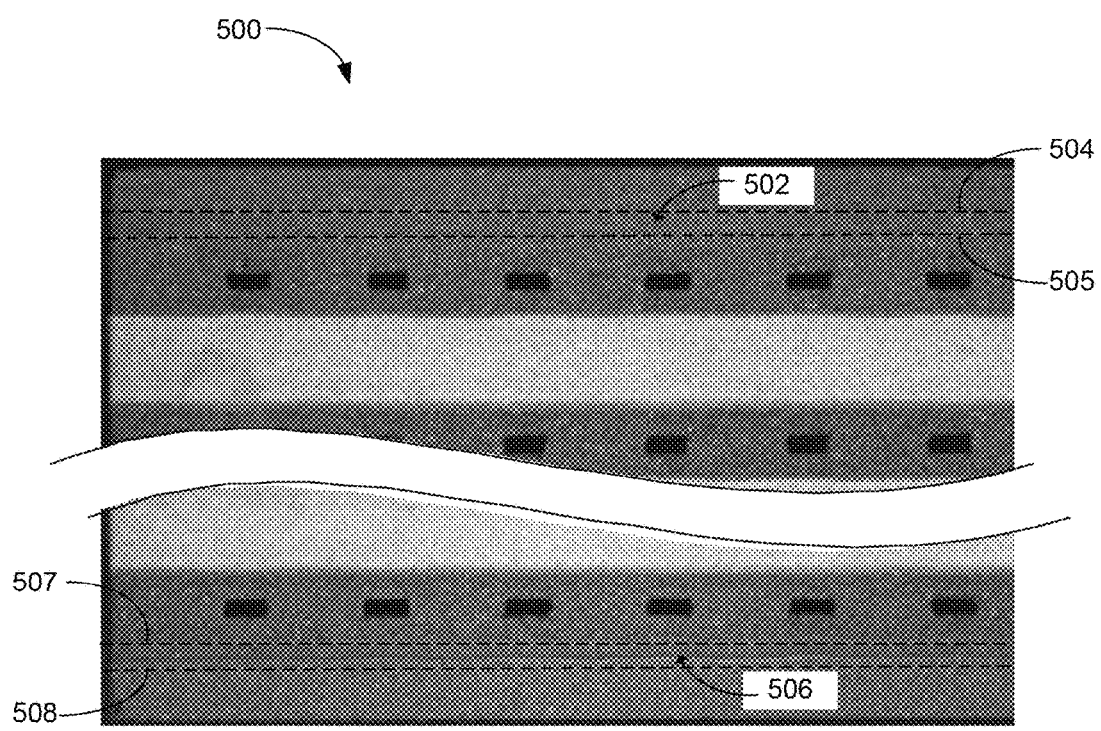
FIG. 5 is a photograph of a two-cell stack with a dense barrier layer formed within the top and bottom cathode layers according to embodiments of the present invention.

FIG. 5 shows a two-cell stack 500 with a DBL formed within the top and bottom cathode layers. The fuel cell stack in FIG. 5 can include any desired number of cells, but only the top and bottom of the stack are shown here for clarity. The DBL layer 502 in the top cathode layer can be seen in between the dashed lines 504 and 505; while the DBL layer 506 in the bottom cathode layer can be seen between dashed lined 507 and 508.

The fuel cell stacks with DBL layers described above were then subjected to the flow-through metric defined earlier. The results of the aforementioned change can be seen in the following table. Gas (air on the cathode side, forming gas on the anode side) was metered to the stack and the output flow was measured. The higher the percentage, the less gas escaped. The results can be seen in the following table.

TABLE 1

|  | Stack w/o Dense Barrier Layer | Stack w/ Dense Barrier Layer |
| --- | --- | --- |
| Anode Flow-Through | 99% | 97% |
| Cathode Flow-Through | 38% | 99% |

Not surprisingly, the anode flow-through numbers are substantially unchanged, having a mere 2% difference between them. This is to be expected since the anode layers in the fuel cell stacks of this example are all interior layers with a dense electrolyte or interconnect layer on either side. The cathode flow-through numbers, however, are greatly improved. In fact, the flow-through percentages for the anode and cathode layers in the stack with the DBLs are approximately equal, having a mere 2% difference between them.

As a solid oxide fuel cell is by its very nature an electrochemical device, the addition of the dense barrier layer must also be evaluated by its affect on electrochemical performance. The electrochemical results of a stack with the dense barrier layer are equivalent if not better than the stack without a DBL, as shown in the table below.

TABLE 2

| | OCV/Cell (V) | Power Density (mW/cm$^2$) |
|---|---|---|
| Stack without Dense Barrier Layer | 1.088 | 210 |
| Stack with Dense Barrier Layer | 1.092 | 222 |

TABLE 3

| DBL configuration | Air leak rate (mbar l/s) | Status |
|---|---|---|
| Thinner DBL | n/a | extreme leak |
| Thicker DBL | 2.86 E−05 | less leak |
| Sandwich DBL | 3.24 E−07 | least leak |

Significantly, embodiments of the present invention can also serve to prevent leakage or contamination from entering the fuel cell though the porous outer electrode layer.

EXAMPLE 2

In an example, a single layer of green DBL tape having a green thickness of between 55 microns and 69 microns, with an average thickness of 62 microns, was sandwiched between 8 layers of green cathode bulk (CB) sheets having a total thickness of 350 µM to form a green stack. The green DBL tape included LSM and YSZ powders having a $d_{50}$ of 1.4 microns and 0.7 microns, respectively. The CB layers included LSM particles having a $d_{50}$ of 46 microns.

The green stack was laminated at 93° C. under 20.7 Mpa prior to a co-sintering operation. After a co-sintering operation, the average thickness of the finally-formed DBL was 15 microns. However, due to deformation during processing, thin sections having thicknesses of less than 10 microns were formed, and gaps through the DBL were also formed.

Figures 6A, 6B, 6C:
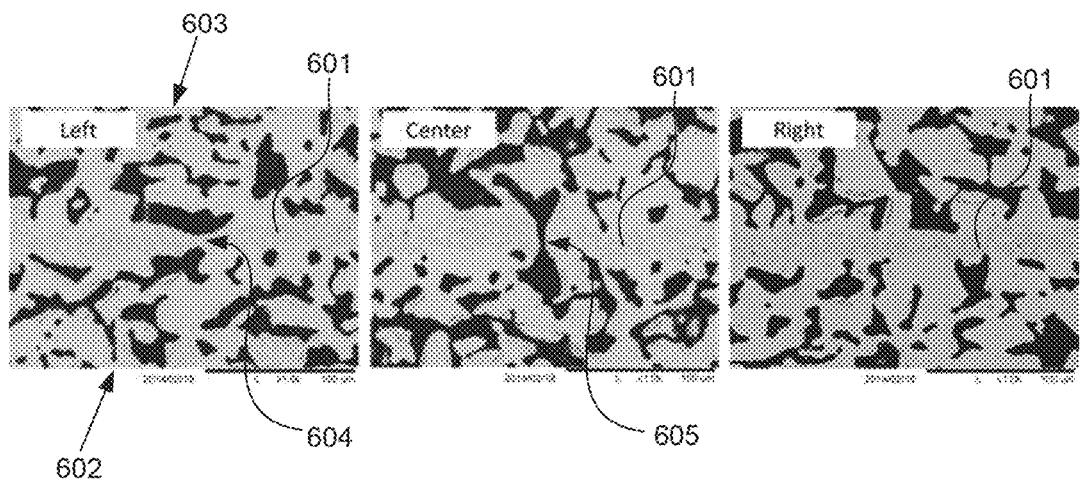
FIGS. 6a, 6b, and 6c are images of a polished cross-section of a dense barrier layer (DBL) and cathode bulk layers taken at various locations along the length of the DBL.

FIGS. 6a, 6b, and 6c are images of a polished cross-section of a dense barrier layer (DBL) and cathode bulk layers taken at various locations (left, center, right, respectively) along the length of the DBL. In particular, FIG. 6a illustrates DBL layer 601 between cathode bulk (CB) layer 602 and CB layer 603. As illustrated, a deformation 604 is formed that is considerably thinner than other portions of the DBL 601, and likely thinner than the average thickness of the DBL 601. FIG. 6b illustrates a gap 605 formed through the DBL 601. Table 3 below indicates the results of air leak testing performed on the relatively thinner DBL, as illustrated in FIGS. 6a, 6b, 6c, as compared to a relatively thicker DBL and a sandwich DBL, which will be discussed further herein. It is noted that the defects formed in the relatively thinner DBL hindered the gas tightness of the DBL and a relatively high leak was observed that was beyond the measurement limits of the air leak detector used.

EXAMPLE 3

In an example, another stack was formed according to Example 2. However, the average thickness of the green DBL tape was increased to 105 microns and a well-integrated DBL was obtained without visible defects after sintering, as illustrated by DBL 801 of FIG. 8. After the co-sintering operation, the finally formed DBL had an average thickness of 35 microns. (FIG. 7 corresponds to the thinner DBL of FIGS. 6a, 6b, and 6c, and is reproduced adjacent to the thicker DBL of FIG. 8 for comparison purposes). No deformation or gaps (puncturing) were detected.

Figures 7, 8, 9:
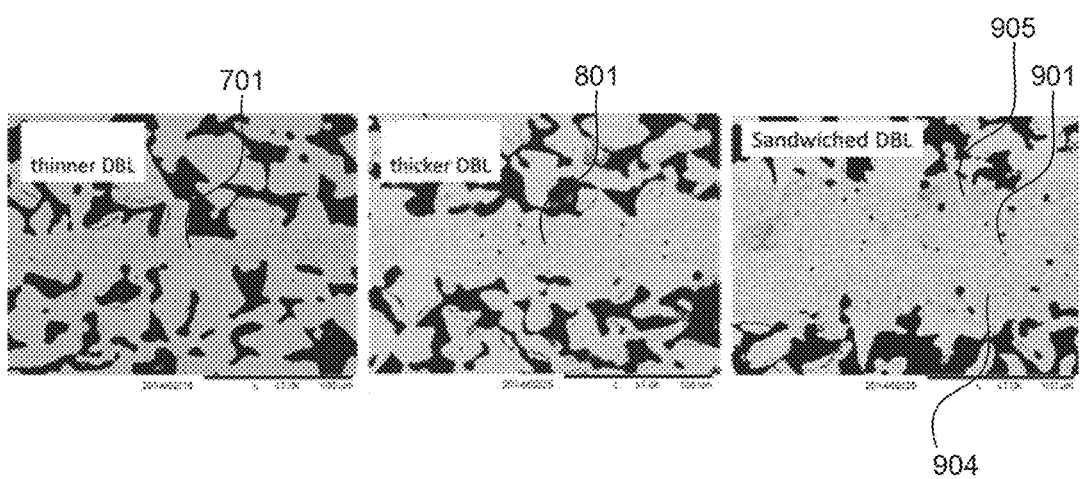
FIG. 7 is an image of a polished cross-section of a respectively thinner DBL than FIG. 8.
FIG. 8 is an image of a polished cross-section of a respectively thicker DBL than FIG. 7.
FIG. 9 is an image of a polished cross-section of a DBL and transition layers in a sandwich configuration.

Air leak tests applied on the thinner DBL of FIGS. 6a, 6b, and 6c, and 7, and the thicker DBL of FIG. 8 demonstrated that the thicker DBL of FIG. 8 improved the gas-tightness and a significantly low air leak was measured to be 2.86 E−05 mbar 1/s (see Table 3).

EXAMPLE 4

In an example, another stack was formed according to Example 2. However, transition layers were provided on both sides of and in direct contact with the DBL in a sandwich configuration. FIG. 9 illustrates DBL 901 sandwiched by transition layer 904 on one side of the DBL, and transition layer 905 on another side of the DBL opposite the transition layer 904. The transition layers 904 and 905 were formed with a mixture of LSM and YSZ powders each having a $d_{50}$ of about 2.8 microns. Each of the transition layers had an average green thickness of about 77 microns. After the co-sintering operation, the finally formed sandwich configuration (including the DBL and two transition layers) had an average thickness of 100 microns. No deformation or gaps (puncturing) were detected.

Air leak tests applied on the sandwich configuration of FIG. 9 demonstrated that the sandwich configuration had an air leak rate of 3.24E-07 mbar 1/s (see Table 3).

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. For example, although much of the previous specification has described solid oxide fuel cells, embodiments of the present invention could also be used with other multi-layer porous ceramic devices such as solid oxide electrolyzers. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub-combination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A solid oxide fuel cell, comprising:
a first porous electrode layer;
a second porous electrode layer over the first porous electrode layer, the second porous electrode layer defining at least one gas passage and having an outer surface;
an electrolyte layer;
an interconnect layer, either the electrolyte layer or the interconnect layer being an intermediate layer between the first porous electrode layer and the second porous electrode layer; and
a dense barrier layer formed on the surface of the second porous electrode layer opposite the intermediate layer or formed within the second porous electrode layer, the dense barrier layer forming a gas seal preventing gas flow within the second porous electrode layer from escaping through the outer surface of the second porous electrode layer,
wherein the dense barrier layer is spaced apart from the interconnect layer;
wherein the dense barrier layer is electrically conductive and compositionally different from the interconnect layer; and
wherein the dense barrier layer comprises at least one material component common to an adjacent electrode layer and a material component common to the electrolyte layer.

2. The solid oxide fuel cell of claim 1, in which the first porous electrode layer is an anode layer and the second porous electrode layer is a cathode layer.

3. The solid oxide fuel cell of claim 1, in which the solid oxide fuel cell includes a plurality of subcells, each subcell including an anode, a cathode, an electrolyte partitioning the anode and cathode, and further including an interconnect between the anode of one subcell and the cathode of another subcell.

4. The solid oxide fuel cell of claim 1, in which the dense barrier layer comprises a gas-tight ceramic layer.

5. The solid oxide fuel cell of claim 1, in which the dense barrier layer comprises particles having a $d_{50}$ of not greater than 10 microns.

6. The solid oxide fuel cell of claim 1, in which the dense barrier layer has a coefficient of thermal expansion that is within about ±5 ppm/° C. of a coefficient of thermal expansion of an adjacent electrode layer.

7. The solid oxide fuel cell of claim 1, in which the dense barrier layer has a same chemical composition as an adjacent electrode layer but has greater conductance.

8. The solid oxide fuel cell of claim 1, further comprising a transition layer disposed adjacent to the dense barrier layer.

9. The solid oxide fuel cell of claim 8, wherein the transition layer is in contact with the dense barrier layer.

10. The solid oxide fuel cell of claim 1, wherein the dense barrier layer comprises a lanthanum-manganite based material.

* * * * *